United States Patent [19]
Delf et al.

[11] 3,820,938
[45] June 28, 1974

[54] CIRCUIT ARRANGEMENT FOR FUEL HEATING DEVICE

[75] Inventors: Gerhard Delf; Günther Schommarz, both of Wolfsburg, Germany

[73] Assignee: Volkswagenwerk Aktiengesellschaft, Wolfsberg, Germany

[22] Filed: Feb. 29, 1972

[21] Appl. No.: 230,269

[30] Foreign Application Priority Data
Mar. 1, 1971 Germany.......................... 2109585

[52] U.S. Cl. ................................ 431/78, 236/21 B
[51] Int. Cl. ............................................. F23n 5/00
[58] Field of Search ................... 431/78; 236/21 B

[56] References Cited
UNITED STATES PATENTS
2,696,876 12/1954 Hartung........................... 431/78 X
3,088,516 5/1963 Marcellino et al................ 431/78 X
3,236,450 2/1966 Bixby et al. ....................... 236/21 B Primary Examiner—William E. Wayner
Attorney, Agent, or Firm—Ernest F. Marmorek

[57] ABSTRACT

Disclosed is a protective circuit for a liquid fuel heating device, particularly in a motor vehicle, comprising a master switching relay for controlling respective operating means of the heating device, a disturbance detecting switch responsive to the fuel ignition temperature and controlling a contact from normal position to an actuating position at which a glow plug in the heating device is discontinued, and a protecting branch circuit including a fuse connected in series with the relay coil of the marker switch, and a protecting contact closing in response to the actuation of the disturbance detecting contact for connecting the fuse to the normal position contact of the disturbance detecting switch, thereby protecting the heating device when the combustion process is interrupted.

8 Claims, 2 Drawing Figures

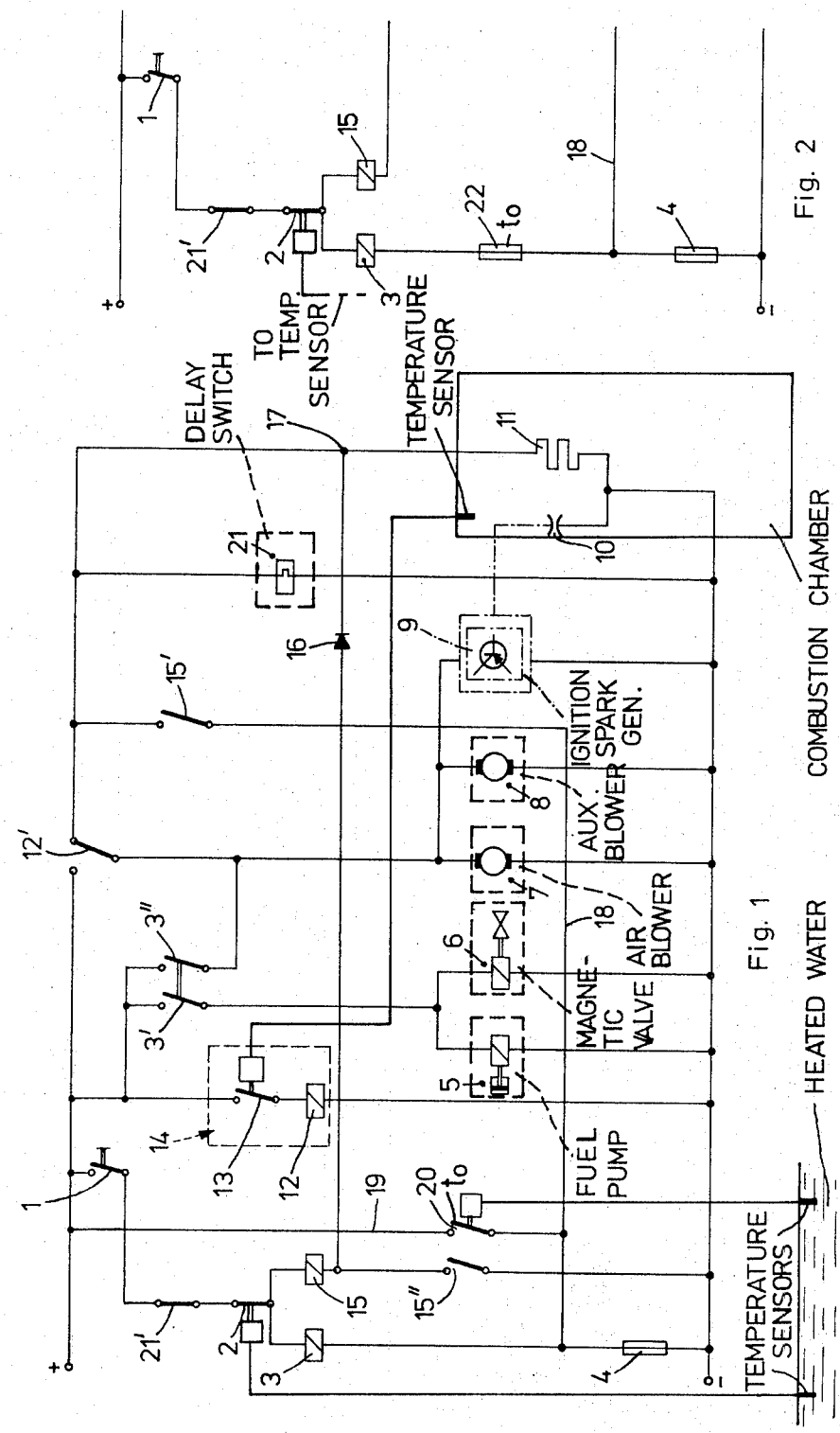

CIRCUIT ARRANGEMENT FOR FUEL HEATING DEVICE

BACKGROUND OF THE INVENTION

This invention relates generally to a heating device fed by a liquid fuel and more particularly it relates to an electric circuit arrangement for this type of heating device used preferably in connection with a motor vehicle.

A heating device of this type includes liquid fuel conduits, a fuel pump and/or a magnetic valve disposed in the path of the fuel conduit, conveying means for the combustion air as well as conduits for heating medium, an ignition spark generator, an ignition spark plug and a glow plug. To protect the various operational units, there is provided a safety switch which in the event of disturbances during the combustion process initiates through a disturbance detecting contact a time delayed disconnection of the heating device. In other words, the disturbance detecting contact becomes only then effective when during the operation of the heating device the flame for some reason becomes extinguished.

Despite the fact that the circuit arrangement of this invention is explained in connection with an auxiliary heating device in a motor vehicle, it is apparent that it is usable for other applications of the liquid fuel heating device as well.

The above described type of heating device has hitherto been employed especially as an auxiliary heating equipment in a motor vehicle. In known embodiments, the disturbance detecting contact is connected in the current supply circuit of the glow plug; this circuit contains an additional time delay switch which disconnects after a certain period of time the entire heating device. The operation of this prior art circuit arrangement is therefore characterized by the fact that in the event of the interruption of the combustion process in the heating device, the disturbance detecting contact which is responsive to the combustion temperature and may be directly coupled to the combustion chamber of the heating device to monitor the conbustion temperature, closes again the current supply circuit for the glow plug thereby providing conditions for the renewal of the ignition process; only upon the expiration of a certain relatively long delay time interval which in average amounts to 3 or 4 minutes, the heating device becomes disconnected from its electric power supply again.

It can be seen that the distinguishing feature of such prior art circuit arrangement resides in the fact that in the event of a disturbance, namely when the flame unexpectedly extinguishes during the heating operation, a system of operating switching contacts responsive to a heating temperature monitor restores the same condition as if the heating device failed to ignite immediately upon its start; in other words, it actuates a special time delay switch which is provided for this purpose.

The disadvantage of the known embodiment resides in that the liquid fuel conveying means keeps supplying the fuel into the combustion chamber of the heating device during the relatively long time delay and in addition the glow plug keeps draining the battery.

It is therfore the primary object of this invention to avoid the disadvantages of the prior art circuits of this type.

In particular it is an object of this invention to create a circuit arrangement which prevents the aforementioned automatic reconnection of the heating device when a disturbance in the heating process occurs.

Another object of this invention is to provide a circuit arrangement which necessitates certain manipulation when a disturbance in the heating process occurs thereby enforcing the repair of the defective operational unit and insuring that the heating device will not automatically start its operation prior to the restoration of proper operative conditions.

A further object of this invention is to maintain all advantages of prior art circuits of this type, namely the maintenance of a preset temperature, for instance by controlling the fuel supply.

SUMMARY OF THE INVENTION

According to this invention, the above objects are attained by providing a protecting circuit branch which includes a protecting switch connected in series with a fuse or circuit breaking device, this protecting switch closing in response to the actuation of the disturbance detecting switch, thereby actuating the circuit breaking device which in turn interrupts the main or master switch for disconnection of the power supply circuits of the fuel pump and/or magnet valve, the ignition spark plug as well as of the glow plug.

In contrast to known circuit of this kind where the disturbance detecting contact during the repeated connection of the current supplying circuit for the glow plug is first connected with a time delay switch timing the operational period of the glow plug and thereupon the time delay contact disconnects by the aid of a contact in the power input circuit the entire heating device, the disturbance detecting circuit in the circuit arrangement of this invention is located immediately in an actuating circuit for a fuse or circuit breaker. This circuit breaker interrupts when actiivated at least the power supplying circuits for the fuel pump or for a magnet valve if such valve is employed and in addition it interrupts both the ignition plug and the glow plug. The conveying means for the heating medium such as heated air or heated water conveyors may hereby remain in operation since the conveying means leave no remnants in the heating device.

Under the direct connection of the disturbance detecting contact in the actuating circuit of the fuse or circuit breaker is to be understood such a circuit arrangement which does not include any time delaying member for the limitation of the operational interval of the glow plug; instead it makes it possible to activate the disturbance detecting contact by the aid of a series of contacts and relays operating in a predetermined time sequence.

In a preferred embodiment of this invention, a switch closing in response to the temperature of the heating medium is arranged in series with the master switch of the entire heating device and closes when the heating medium has attained a predetermined minimum temperature. This modification of the switching circuit arrangement of this invention enables in a simple manner that the circuit automatically distinguishes between the aforementioned disturbance in the heating device on one side and between the disturbance during the normal heating operation on the other side. This distinction is due to the fact that the disturbance detecting contact remains closed in its normal first position until the ignition fuel with the heating device is attained.

The aforementioned circuit breaking device which may be conventional melting fuse for example, is connected in series with the master relay switch which controls by its contacts the power supply circuits for the fuel pump and/or the magnetic valve, the ignition spark plug and the glow plug; the master switching relay and other protecting contacts are operated by a start-stop switch. Upon the actuation of the master switching means, and immediately upon the ignition of the fuel within the heating device, the disturbance detecting switch which closes in response to the ignition of the fuel within the heating device causes that a moveable disturbance detecting contact switches over from its normal first position into a second actuating position; in response to this switching action, the protective switch in the aforementioned protecting branch circuit closes and connects the circuit breaking device to the normal position contact of the disturbance detecting switch. In the event that disturbance occurs in the heating device, for example if the flame extinguishes during the heating operation, the disturbance detecting switch opens and its moveable contact returns to its normal first position; through the contacts of the master switching means and through the closed protective switch however a short circuit will result, the circuit breaker becomes activated and interrupts the master switch. In addition the protective switch short circuits also the relay coil of the master switching means and contributes thereby to the interruption of the master switching contacts.

In another embodiment of this invention the aforementioned protective circuit including the circuit breaking device cooperating with the disturbance detecting switching means, is combined in series with a contact which closes in response to a predetermined minimum temperature of the heating medium. When employing this combination in the circuit arrangement of this invention there results a temperature controlling arrangement which upon the attainment of a desired minimum temperature of the heating medium will disconnect the heating device and simultaneously utilize the safety or protecting circuit of the fuse or the circuit breaking means cooperating with the protecting switch.

Due to the fact that the fuse or the circuit breaker in the arrangement of this invention is utilized for a multiple protective action, this invention is especially suitable for installation into a motor vehicle where spatial conditions are limited. For instance, the fuse or the circuit breaker is arranged also in series with a contact switch which closes in response to excess heat. As the overheating may be caused also by a failure of an operational unit in the heating device such as for example by a malfunction of the hot air blower or of the heating medium conduits, it is an advantage when the entire heating device becomes inactive and can be returned to its normal operative condition only upon a certain manipulation, in this case upon the replacement of the fuse. In this manner the fuse or circuit breaker responds both to the disturbances in the heating device as well as to the over-heating.

To activate the fuse or the circuit breaker during over-heating it is possible to employ principally the same circuit arrangement which has been described above in connection with the protection against disturbances during normal operation of the heating device. In other words in the event of a failure, the voltage of the power source is applied directly to the fuse which in turn causes the interruption of the current supply to all operation units where a failure may occur. The aforementioned combination of the protective branch circuit including the fuse or a circuit breaker and a relay switch which closes in response to a predetermined excess temperature of the heating medium is designed so it bypasses all remaining protective and controlling switches in the circuit arrangement of this invention.

In another modification of this invention, however, the switch responsive to the excess temperature can be deleted and replaced by an additional fuse which is connected in series to the first mentioned fuse and which is responsive to excess temperature only to discontinue the master switch when over-heating occurs. In this event the first current responsive fuse remains unaffected unless a disturbance in normal operation of the heating device takes place.

As it has been explained initially, the prior art arrangements of this type are characterized by a time delay member which limits the operational period of the glow plug when during a predetermined operational period of the glow plug no ignition of the fuel within the heating device is accomplished. This time delay member in known devices is connected in series with the glow plug.

In the preferred embodiment of this invention, the circuit arrangement can also be provided with a time delay switch. In contrast to the prior art time delaying arrangement, however, the switch is not connected in series with the glow plug but its sensor is connected in parallel to the glow plug and is responsive to its voltage or to its resistance heat, whereas the contact of the time delay switch in turn is connected in series with the master switching means.

As the time delay switching member in the circuit of this invention provides for the limitation of the operational period of the glow plug it protects thereby the battery when the glow plug fails to ignite the fuel; in order to disconnect the glow plug if the ignition takes place and a normal operation of the heating device is initiated, a contact is provided in series with the disturbance detecting switch, which actuates the relay of the disturbance detecting switch as soon as combustion heat is developed and causes the switching of the movable contact from its normal first position to the actuating position in which the glow plug is disconnected. As it will be explained later the circuit arrangement of this invention is such that during the movement of the contact of the disturbance detecting means the aforementioned protective contact in the branch circuit of the fuse or circuit breaker becomes closed. This protective branch circuit is permanently connected to the glow plug. By monitoring the temperature of the heating medium it is possible to determine whether the disconnection of the glow plug should be effected immediately upon the start of the ignition process when the temperature of the heating medium is still low or whether the disconnection of the glow plug should be made during the normal operation of the heating device when the heating temperature is relatively high. For this purpose there is provided in series with the fuse or circuit breaker an additional switch which is responsive to the minimum temperature of the heating medium and which disconnects the holding means of the main or master switch when the minimum temperature has been attained.

According to this invention, the protective branch circuit including the fuse of circuit breaker and the protective switch, is made responsive to the actuation of the disturbance detecting switch in the following manner: The protective contact which is connected between the fuse and the fixed normal position contact of the moveable disturbance detecting contact is controlled by the aid of a relay the coil of which is connected through a diode to a common point between the glow plug and the fixed normal position contact of the disturbance detecting switch. This relay controls another holding contact which closes when the relay armature is connected and holds the relay in its actuated position. If the moveable disturbance detecting contact is in its normal or first position, there is no potential difference on the coil of the protective switch relay and the relay contacts are in their open condition. If, however, the movable disturbance detecting contact switches to its second or activating position, the glow plug becomes disconnected from the power source and the full potential is applied through the diode and the glow plug to the coil of the protective relay and consequently the protective switch in the protective branch circuit will be closed. The protective relay is held in its activated position due to the aforementioned second contact even if the disturbance detecting contact switches back to its initial normal position.

BRIEF DESCRIPTION OF THE DRAWINGS

For a fuller understanding of the nature and objects of the invention, reference should be had to the following detailed description, taken in connection with the accompanying drawings, in which:

FIG. 1 is a schematical circuit diagram of a preferred embodiment of the circuit arrangement of this invention; and FIG. 2 is a schematical diagram of a modified part of the circuit diagram of FIG. 1.

DETAILED DESCRIPTION

Carrying the invention into effect in the embodiments which have been selected for illustration in the accompanying drawings and for description in the specification, and referring now particularly to FIG. 1, there is illustrated a protective circuit arrangement for a liquid fuel heating device, where the illustrated positions of the respective contacts correspond to the inactive condition of the heating device. The heating device becomes activated by connecting switching relay 3 to terminals or poles of a power source by closing a start-stop switch 1. The master switching relay 3 is connected in series with a fuse 4 and with a normally closed contact of the switch 2 which closes in response to a minimum temperature of the heating medium; the normally closed contact 21' may be also connected in series with the master switch relay to control the latter in response to the condition of the glow plug as it will be explained later. The heating medium is preferably air or water.

In the shown embodiment, the fuse or circuit breaker 4 will become activated not only by the disturbances during the normal operation of the heating device, but also due to the excess temperature of the heating medium as it will also be disclosed in the following paragraphs.

The master relay 3 controls relay contacts 3' and 3" which upon their actuation close current supply circuits for the fuel pump 5 and/or for the magnet valve 6 disposed in the fuel supply conduits (not illustrated), as well as circuits for the driving motor of the combustion air blower 7 and the water pump or an auxiliary blower 8. The master contact 3" also closes the power supply circuit for an ignition spark generator 9 which starts feeding ignition pulses for the ignition plug 10. The spark plug 10 is situated within the combustion chamber (not illustrated) of the heating device; a glow plug 11 is also located in the combustion chamber to aid the spark plug 10 in initiating the ignition process. As soon as the ignition process begins, the glow plug 11 becomes disconnected from the power source by the contact 12'.

The contact 12' is a moveable contact of the switching relay 12 which in combination with a switch 13 forms the disturbance detecting switch 14 as marked in dashed lines in FIG. 1. Temperature sensitive switch 13 responds to the development of a combustion temperature within the combustion chamber and is arranged in such a manner as to close immediately upon the start of the combustion process. Due to this action, the current supply circuit for the relay 12 is closed and the contact 12' is switched over from its normal first position (as shown in FIG. 1) to a second actuating position. It is apparent that this movement of contact 12' is effected with a certain time delay with respect to the actuation of the switch 13.

According to one feature of this invention, there is provided a switching relay 15 controlling two contacts 15' and 15". The coil of the relay 15 is connected via contacts 2, 21' and 1 to the positive pole of the power source at one of its terminals, whereas the other terminal is connected through a diode 16 directed in its forward direction to the common point 17 between the fixed normal position contact 12' and the glow plug 11. When the contact 12' is in its normal or first position the relay 15 stays inactive even if the master switch relay 3 is actuated and the contacts 3' and 3" are closed, since there is no difference of potentials across the coil of the relay 15. Only when contact 12' is displaced from its normal position to its actuating position that means when the ignition process is initiated and the glow plug 11 is disconnected from the power source, there will result a voltage difference across the relay 15 and the latter becomes actuated. As a result contacts 15' and 15" will close and contact 15" will hold the relay 15 in its active position even if the contact 12' will return to its initial normal position.

The other contact 15' of the relay 15 directly connects the fuse 4 with the normal position contact of the moveable contact 12', thereby forming a protective branch circuit 18. When the contact 15' is closed that means when the normal combustion operation in the heating device has begun but when the disturbance detecting moveable contact 12' returns to its normal position (as illustrated) due to the opening of the switch 13 when the normal combustion process is interrupted, the current from the power source passes through the closed master contacts 3' and 3" and through the disturbance detecting contact 12' and through the protecting contact 15' into the protective branch circuit 18 and the resulting short circuit discontinued the fuse 4 which in turn opens the master switching relay 3. In this manner the moveable contact 12' performs two functions, namely a timely disconnection of the glow plug 11 when the latter in cooperation with the spark plug 10 initiates the ignition process and in addition it represents a disturbance detecting contact which when the flame in the combustion chamber accidentally extinguishes will cause the interruption of the master switch.

In the preferred embodiment as shown in FIG. 1 there is provided an additional protective circuit branch 19 including a switch 20 which closes in response to a predetermined excess temperature of the heating medium. A contact of the switch 20 is connected through the fuse 4 directly to the poles of the power source. The protective circuit 19 acts irrespective of the position of contacts 12' and 15' and actuates the fuse or circuit breaker 4 when the temperature of the heating medium exceeds the present value.

In the circuit arrangement of this invention is also provided the aforementioned time delay switch 21 with a contact 21' that is connected in series with the master switching relay 3. The sensor of the switch 21 is connected across the glow plug 11 and responds to the voltage drop across the glow plug 11 or to the resistance temperature thereof so as to open the contact 21' between the start-stop switch 1 and the switch 2 when, for example after 3 or 4 minutes of operation of the glow plug 11, no ignition of fuel in the combustion chamber takes place.

The operation of the circuit arrangement of this invention is as follows:

Upon actuation of the start-stop switch 1 the master switch relay 3 becomes energized from the power source the normally closed contacts 21' and 2; master switch contacts 3' and 3'' thereby close current supply circuits for respective operating devices 5 to 8 as well as the ignition means 9 to 11. Until the ignition process is initiated, the disturbance detecting contact 12' maintains its normal position as shown in the drawing and the glow plug 11 is fed by the current to cooperate with the spark plugs 10 in igniting the fuel within the combustion chamber. Since both terminals of the relay 15 are connected to the plus pole of the battery during this starting period, no potential difference will result across its coil and the relay 15 will remain in its inactive position wherein the contacts 15' and 15'' are open and the protecting circuit branch 18 is interrupted.

Provided that no ignition is accomplished during this starting interval, the sensor of the time delay switch 21 will respond to the voltage drop across the glow plug 11 — caused by the change in resistance of the plug 11 due to resistance heating — and opens its contact 21' so that master relay 3 is inactivated and contacts 3' and 3'' will open.

Accordingly, the fuel pump 5, the magnetic valve 6, if employed, the heating air blower 7, the auxiliary blower 8, and the ignition spark generator 9 become disconnected from the power source.

If a normal operation of the heating device is initiated during the starting interval, that is if the ignition spark and glow plug ignite the fuel within th combustion chamber, the combustion temperature sensor is activated and closes the contact of the switch 13. The relay 12 of the disturbance detecting switch 14 becomes energized and displaces the disturbance detecting contact 12' from its normal or its first position (as illustrated in FIG. 1) to its actuating or second position thereby disconnecting the current supplying circuit branch for the glow plug 11. As a result, the common point 17 between the normal position contact of the moveable contact 12' and the glow plug 11 has practically a minus potential and due to the forward connection of the diode 16 between the relay coil of the switching relay 15 and the common point 17 a voltage differential occurs across the relay 15 and contacts 15' and 15'' will close. The contact 15'' serves as a holding contact for the relay 15 and holds closed the contact 15' in the protecting circuit branch 18 irrespective of the position of the moveable contact 12'.

Provided that for some reason or other the flame in the combustion chamber of the heating device becomes extinguished the resulting temperature drop in the combustion chamber affects the temperature sensitive switch 13 in the disturbance detecting switching arrangement 14, the relay 12 returns its contact 12' to its normal first position. In this event, however, due to the short circuit through the closed contact 15' the fuse of circuit breaker 4 is activated and interrupts the power supply to the master switching relay 3. The entire circuit can only then become operative when the cause of failure of the heating device is removed and the fuse 4 replaced.

If for some reason the heating medium exceeds a predetermined level of the heating temperature the switch 20 which is responsive to the excess temperature closes and an additional protecting circuit 19 is connected to the same fuse or circuit breaker 4 to discontinue the master switch relay 3. In this manner the fuse 4 functions as a safety device for two different sources of failure. The second protecting circuit branch 19 is connected practically parallel with the first mentioned protecting circuit branch 18 but since it is always connected to the plus pole of the battery, it disconnects the entire heating device ireespective of the position of the contact 12' and 15'.

As it has been mentioned above the actuation of the fuse 4 causes the interruption of the power supply path for the master switching relay 3; inasmuch as the contacts 3' and 3'' are closed when a disturbance takes place in the heating device the master relay 3 will be bridged by the closed contacts 12' and 15'. Nevertheless, until the opening of contacts 3' and 3'' the power supplying circuits for respective operating devices 5 to 10 remain intact. A repeated connection of the glow plug 11 to the power supply is prevented due to the fact that the contacts 3 and 3'' act with a higher speed in comparison to the switching speed of the disturbance detecting switch 14.

Referring now to FIG. 2, there is illustrated a modification of the protection against excess heat of the heating medium which eliminates the second protecting circuit branch 19. The switch 20 which in the circuit of FIG. 1 responds to the excess temperature of the heating medium is replaced in FIG. 2 by an additional fuse 22 which is connected in series with the current sensitive first fuse 4. The additional fuse 22 is sensitive to an excess temperature and can be made in the form of melting fuse. The fuse 22 is arranged preferably between the master switch relay 3 and the first current sensitive fuse 4. The first protective circuit branch 18 is connected to the common point between the two fuses 4 and 22. In contrast to the embodiment of FIG. 1, only the fuse 22 becomes activated by excess heat to interrupt the current supply to the master switching relay 3 whereas the first fuse 4 remains intact.

Referring again to the circuits of FIG. 1, it will be seen that the contact 21' of the time delay switch 21 is also connected in series with the power supply circuit of the master switching relay 3. Similarly as in the case of overheating, the master switch 3 with contacts 3' and 3'' becomes discontinued when — after a predetermined operational period of the glow plug 11 — no combustion process will take place within the combustion chamber of the heating device.

All of the above-mentioned protective measures respond to an occurrence of a disturbance only and do not affect the controllability of the circuit arrangement for the heating device of this invention. For this purpose, there is provided a switch 2 which opens as soon as the heating medium (heating air or water) attains a predetermined minimum temperature. In this event, the contact of the switch 2 which is also connected in series with the power supply circuit branch of the master switching relay 3 will de-energize the relay 3 and the contacts 3' and 3'' will open. Simultaneously the relay 15 also becomes de-energized, contact 15' and 15'' will open and the first protecting circuit branch 18 is discontinued. In principal, it is possible to return the contact 12' to its normal position with a certain time delay, since due to the interruption of the master contacts the fuel pump 5 or the optional magnet valve 6 in the fuel supply conduits are already out of operation when the operating devices 7 to 10 are being disconnected.

We wish it to be understood that we do not desire to be limited to the exact details of the circuit arrangement shown and described for obvious modifications will occur to a person skilled in the art.

Having thus described the arrangement, what we claim as new and desire to be secured by letters Patent, is as follows:

1. A control system for a fuel operated heating device containing a heating medium, said control system being adapted to be connected to a source of electric power, said control system comprising fuel delivery means including first circuit means adapted to be connected to the source of power for delivering fuel to the heater; combustion air delivery means including second circuit means adapted to be connected to the source of power for delivering air to the heater; an ignition spark generator including third circuit means adapted to be connected to the source of power; a glow plug including fourth circuit means adapted to be connected to the source of power; a spark plug connected in series with said ignition spark generator for igniting a mixture of the fuel and air and including fifth circuit means adapted to be connected to the source of power; a master relay including sixth circuit means adapted to be connected to the source of power, said master relay further including first contact means for closing said first and second circuit means upon energization of said master relay; disturbance detecting means responsive to the combustion temperature and having second contact means for de-energizing said glow plug upon ignition of the mixture of fuel and air by said spark plug, a first protecting circuit means comprising a first branch common with said sixth circuit means, said first branch including a current sensitive circuit breaking means, said first protecting circuit further comprising a second branch bypassing said master relay and leading from said first branch to said fourth circuit means between said glow plug and said second contact means, said second branch further including third contact means that open in response to a predetermined minimum temperature of the heating medium whereby said first protecting circuit is closed only during excitation of said master relay and when the heating medium has at least its minimum temperature and said spark plug fails to ignite the fuel and air mixture.

2. The control system according to claim 1 wherein said second contact means is movable between a first position for closing said fourth circuit means via said first contact means and a second position for breaking said fourth circuit means and closing a portion of said second circuit means that bridges said first contact means.

3. The control system according to claim 1 further including a first switch that opens in response to the predetermined temperature, said first switch being in series with said master relay and a relay in series with said first switch for activating said third contact means, said relay including seventh circuit means adapted to be connected to the source of power, there being further included diode means which, together with said first switch, are connected to said fourth circuit means between aid glow plug and said second contact means, said diode means being poled to close said seventh circuit means only upon opening of said second contact means.

4. The control system according to claim 3 wherein said relay, when energized, closes a holding contact bridging said glow plug.

5. The control circuit according to claim 1 wherein said current sensitive circuit breaking means is in a second protecting circuit bridging said master relay and wherein there is further included fourth contact means that close in response to an excess temperature of the heating medium thereby activating said current sensitive circuit breaking means.

6. The control system according to claim 1 wherein there is further included a second circuit breaking means that is sensitive to an excess temperature, said second circuit breaking means being connected in series between said master relay and said current sensitive circuit breaking means.

7. The control system according to claim 1 wherein there is further included a time delay switch connected in parallel with said glow plug and having fifth contact means in said sixth circuit means for breaking said sixth circuit means after a predetermined time of energization of said glow plug.

8. The control system according to claim 1 wherein there is further included a magnetic valve for controlling the delivery of the fuel.

* * * * *